Dec. 16, 1924.
J. M. CALKINS
1,519,437
DIRIGIBLE HEADLIGHT FOR VEHICLES
Filed May 5, 1923
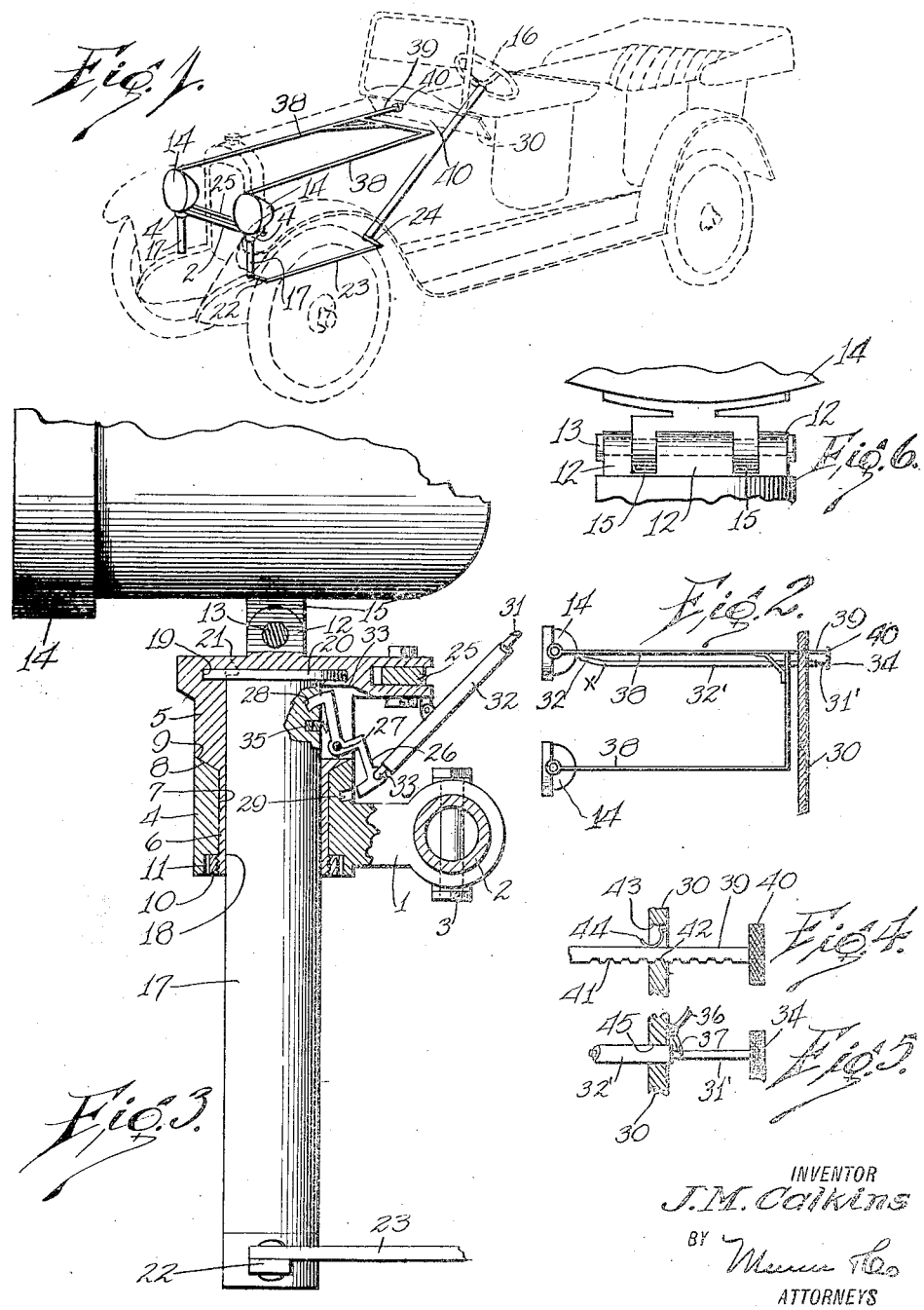

Patented Dec. 16, 1924.

1,519,437

UNITED STATES PATENT OFFICE.

JAMES M. CALKINS, OF CHICAGO, ILLINOIS.

DIRIGIBLE HEADLIGHT FOR VEHICLES.

Application filed May 5, 1923. Serial No. 636,945.

*To all whom it may concern:*

Be it known that I, JAMES M. CALKINS, a citizen of the United States, and a resident of Chicago, in the county of Cook and State of Illinois, have invented a new and useful Improvement in Dirigible Headlights for Vehicles, of which the following is a full, clear, and exact description.

My invention relates to improvements in dirigible headlights for vehicles, and it consists in the combinations, constructions, and arrangements herein described and claimed.

The principal object of my invention is to provide an improvement over that form of the device disclosed in my Patents No. 1,284,874, November 12, 1918, and No. 1,315,463, of September 9, 1918. In said patents I disclosed dirigible headlight mechanisms which are adapted to turn the headlights when the steering wheel is turned, and which are also adapted to place the headlights in inoperative position, whereby the lights will remain fixed in much the same manner as the standard headlight. The present device provides a more novel and simple means for permitting the driver to operatively connect or disconnect the headlights from the steering wheel.

A further object of my invention is to provide a device of the type described which may be readily attached to a standard automobile with but slight alterations being necessary in the latter.

A further object of my invention is to provide a device of the type described in which the control mechanism is simple in construction and may be readily manipulated by the driver.

Other objects and advantages will appear in the following specification, and the novel features of the invention will be particularly pointed out in the appended claims.

My invention is illustrated in the accompanying drawings forming part of this application, in which—

Figure 1 is a perspective view of an automobile showing the device operatively applied thereto, Figure 2 is a diagrammatic plan view of the device, Figure 3 is a vertical section through the device, portions thereof being shown in elevation, Figures 4 and 5 are detail sectional views of the control means, and Figure 6 is a detail view of the hinge connecting the headlight to the device.

In carrying out my invention I provide a supporting member 1 that is mounted on a rod 2 and is secured in place by means of a bolt 3. The rod 2 is usually provided in standard makes of cars.

The member 1 is provided with a collar 4 in which a lamp carrying standard 5 is rotatably disposed. The standard 5 is provided with a conical-shaped shoulder 8 and is rotatably carried by a conical-shaped recess 9 in the collar 4. The lower end of the cylindrical portion 6 is threaded and receives a nut 10. The nut is rotatably disposed in a groove 11 of the collar 4, and bears against the collar so as to prevent longitudinal movement of the standard with respect to the collar.

In the present form of the device I have shown the standard 5 as being provided with lugs 12 through which a pin 13 extends, (see Figure 6). The headlight 14 has lugs 15 which are adapted to be received between the lugs 12. The pin 13 pivotally secures the lugs together, whereby the light 14 may be swung about the pin 13 as an axis.

Means for swinging the headlight 14 in a horizontal plane when the steering wheel 16 is turned is clearly shown in Figures 1 and 3. A rod 17 is rotatably disposed in the bore 18 of the standard 5. The standard 5 has a slot 19 which extends through the standard and communicates with the bore 18. A disc 20 is inserted in one of the ends of the slot 19 and is moved into the slot so as to align the threaded opening 21 with the bore 18. The rod 17 may be inserted into the bore 18 and then be screwed into the threaded opening 21 in the disc 20. The lower end of the rod 17 has an arm 22 which is pivotally connected to a link 23, the link in turn being connected to an arm 24 of the steering wheel 16. It will be noted from this construction that a swinging of the steering wheel 16 will cause the rod 17 to oscillate.

In the present form of the device I have shown two headlights 14, these headlights being supported by standards 5 and supporting brackets 1. One set of standards 5 and brackets 1 is provided with means for connecting the lights 14 to the steering wheel, whereby the lights will be turned by the steering wheel, or for connecting the lights to the supports 1, whereby the lights will remain fixed in the same manner as the standard headlight. The mechanism for connecting the standards 5 to the rods 17 or to the standards 1 is not needed in both headlights, since the headlights are operatively connected to each other by means of a link 25. The link 25 is secured to the standards 5.

Means for connecting the standard 5 to the rod 17 or to the support 1 consists of a lever 26 which is pivoted at 27 to the standard 5. The rod 17 has a recess 28 therein which is adapted to receive one end of the lever 26. The support 1 has a recess 29 which is adapted to receive the other end of the lever 26. When the end of the lever 26 is disposed in the recess 28, its other end is removed from the recess 29, whereby the standard will be swung when the rod 17 is oscillated. The reverse is true when the other end of the lever 26 is disposed in the recess 29, i. e., the standard 5 will be prevented from rotating since it is rigidly secured to the support 1.

The lever 26 is adapted to be swung by a mechanism which is controlled from the dashboard 30 of the automobile. In Figure 2 I have shown the control diagrammatically. This control consists of a flexible rod 31 that is slidably disposed in a flexible casing 32. The flexible rod and the casing are of standard construction. One end of the rod 31 is connected to the lever 26 at 33, while the other end is connected to a straight rod 31' at $x$. The rod 31' is slidably mounted in a sleeve 32' and is provided with an actuating handle 34. In Figure 5 I have shown an enlarged view of the handle 34 and casing 32'. It will be noted from Figure 3 that a spring 35 tends to swing the lever 26 so as to dispose the lower end of the lever in the recess 29. This movement of the lever disconnects the headlights from the steering wheel 16. In case the driver wishes to have the headlights swing when the steering wheel 16 is turned, he pulls upon the handle 34 so as to move the handle or knob away from the dashboard 30. This movement causes the lever to swing into the position shown in Figure 3. A spring pressed locking dog 36 engages with a notch 37 in the rod 31', whereby the push button 34 is prevented from moving toward the dash board. As soon as the locking dog 36 is manually released from the notch 37, however, the spring 35 will instantly cause the lever 26 to engage with the support 1 and will cause the push button to move toward the dash board. As heretofore stated, when the standard 5 shown in Figure 3 is held in fixed position by means of the lever 26 engaging with the support 1, the standard 5 of the other headlight controlling means is also held in fixed position due to the fact that both standards are secured to each other by means of the link 25.

I also provide a simple means for swinging the lights about the pins 13. This means is shown diagrammatically in Figures 1 and 2, and consists of rods 38, which are connected to the headlights 14 in such a manner that the headlights may be rotated in a horizontal plane. The rods 38 are connected to a common control rod 39 which is provided with a handle 40. The rod 39 is serrated at 41, (see Figure 4), and is adapted to engage with teeth 42 in the wall of the opening 43 of the dashboard 30. A leaf spring 44 yieldingly holds the rod 39 in such a position that the teeth 41 and 42 mesh whereby the rods 38 are held in fixed position. When the driver wishes to swing the headlights about the pins 13, he merely raises the rod 39 in order to disengage the teeth 41 from the teeth 42, whereupon the rod may be moved to any position desired so as to swing the headlights into the desired angle.

From the foregoing description of the various parts of the device, the operation thereof may be readily understood. The device may be readily attached to a standard automobile. The supports 1 are moved on to the rod 2 and are then held in place by means of the bolts 3. As heretofore stated, the rods 38 are disposed on the inside of the hood, and are connected to the actuating rod 39. The dashboard is provided with two openings 43 and 45 through which the rod 39 and the casing 32' extend. The link 23 operatively connects the steering wheel 16 with the rod 17, whereby the rod 17 is oscillated when the steering wheel is turned. The driver can operatively connect the lights 14 to the steering wheel so that they may be turned when the steering wheel is turned, or he can connect the lights to the supports 1, whereby the lights will remain in fixed position. The driver can also swing the lights in a vertical plane if he so desires. The device is simple in construction, durable, and efficient for the purpose intended.

I claim:

1. A dirigible headlight comprising a support, a light carrying member rotatably carried by said support, means for turning said member, a trigger pivotally carried by said member for connecting said member with said support or with said turning means, spring means for yieldingly holding said trigger in engagement with said support, flexible means connected to said trigger for moving said trigger out of engagement with said support and into engagement with said turning means, and manually controlled means for causing said flexible means to hold said trigger in engagement with said member.

2. A dirigible headlight comprising a support, a light carrying member rotatably carried by said support, means for turning said member, a trigger pivotally carried by said member for connecting said member with said support or with said turning means, a spring yieldingly holding said trigger in engagement with said support, a flexible rod connected to said trigger for moving said trigger out of engagement with said support and into engagement with said turning means, and a latch for holding said rod against movement, whereby said rod will hold said trigger in engagement with said support.

JAMES M. CALKINS.